United States Patent [19]

Sonoda et al.

[11] Patent Number: 4,855,560
[45] Date of Patent: Aug. 8, 1989

[54] WELDING ROBOT

[75] Inventors: Akikazu Sonoda, Akahsi; Sinji Fujita; Masanobu Sato, both of Kobe; Syoji Tomono, Kakogawa; Hisanori Nakamura, Toyota, all of Japan

[73] Assignees: Kawasaki Jukogyo Kabushiki Kaisha; Toyota Jidosha Kabushiki Kaisha, both of Japan

[21] Appl. No.: 148,855

[22] Filed: Jan. 27, 1988

[51] Int. Cl.[4] ............................................. B23K 11/36
[52] U.S. Cl. ...................... 219/86.25; 901/42
[58] Field of Search .................. 219/86.25, 125.1; 901/42

[56] References Cited

U.S. PATENT DOCUMENTS 4,438,309  3/1984  Zimmer ........................... 219/86.25
4,507,534  3/1985  Kaufmann et al. ................ 901/42

Primary Examiner—Clifford C. Shaw
Attorney, Agent, or Firm—Stevens, Davis, Miller & Mosher

[57] ABSTRACT

An industrial spot welding robot having a swingable arm carrying a welding gun at a tip end. Fluid hoses are provided for circulating cooling liquid through the welding gun and for supplying gun actuating compressed air to the welding gun. The fluid hoses are arranged to extend along the robot arm to the base of the robot so that posts or other members are not required to support the hoses.

7 Claims, 3 Drawing Sheets

WELDING ROBOT

BACKGROUND OF THE INVENTION

1. Field of the Invention

The present invention relates to an industrial welding robot and more particularly to a spot welding robot. More specifically, the present invention pertains to an industrial spot welding robot having conduits for supplying cooling medium and/or welding gun actuating fluid to the welding gun.

2. Description of the Prior Art

The spot welding is a typical resistance welding technique and comprises steps of superposing two or more metal sheets, placing the superposed metal sheets between a pair of electrodes and applying a depressing force through the electrodes to the superposed metal sheets while applying electric current through the electrodes so that welded spots are formed in the metal sheets. In this welding process, the electrodes are applied not only with an electric current but also with a depressing pressure so that the electrodes are subjected to a temperature rise. In order to suppress the temperature rise, the electrodes are generally made of a copper alloy having a superior thermal conductivity and facilities are provided for effecting liquid cooling of the electrodes.

Conventionally, a spot welding robot which is currently adopted in a car manufacturing factory has a spot welding gun of a so-called C-type or X-type which includes a pair of electrodes or a spot welding gun of a type having a backing electrode and a stud gun. The welding gun is generally mounted on a hand of a robot which is actuated by a control unit in accordance with a mode of operation which is in advance taught to the robot. In a modern welding robot, weldings can be made rapidly even at positions which would be difficult to have an access by a human hand and with a high accuracy in accordance with a schedule which is preliminarily taught to the robot. Thus, a welding robot is now regarded as essential for mass production in a manufacturing factory.

In a conventional welding robot, the conduits for supplying the cooling medium and the gun actuating working fluid are supported on a post provided for the purpose at a side of the robot body and connected with appropriate portions in the robot hand. In an alternative arrangement, the conduits for the cooling medium and the gun actuating working fluid are supported on the ceiling of the factory building. In order that the movements of the robot are not disturbed by the conduits, the conduits must be slackened at portions between the robot hand and the supporting post or the ceiling.

In the conventional arrangements, it has therefore been required to conduct adjustments of the lengths of the conduits after the installation of the robots. More specifically, the robot body is at first installed in a predetermined position and then the conduits are attached to desired portions with appropriate adjustments of the conduit lengths for providing required slackenings of the conduits. Thus, the installation of the conduits requires a lot of time and labor.

It should further be pointed out that, in the conventional robots requiring conduit supporting posts which are to be located in the vicinity of the robot bodies, there must be provided increased spaces for arranging the robots. A further disadvantage in the conventional structure is that the conduits for the cooling medium and the gun actuating working fluid are arranged in a relatively unstable way by being hung on the supporting posts or on the ceiling. The conduits arranged in this manner are frequently brought into contact with the robot body and the supporting posts during operations of the robot. Further, the conduits are repeatedly stretched and bent upon movements of the robot arm. Thus, the conduits are used in conditions in which they are very easily damaged. Still further, the conventional robot is disadvantageous in that the movements of the robot are restricted by the conduits.

SUMMARY OF THE INVENTION

It is therefore an object of the present invention to provide an industrial welding robot having conduits for cooling medium and gun actuating working fluid but does not require an external means such as a supporting post for the conduits.

Another object of the present invention is to provide an industrial welding robot in which the possibility of the conduits being damaged is substantially eliminated.

A still further object of the present invention is to provide a welding robot in which time and labor can be significantly decreased for installing the conduits for the cooling medium and the gun actuating working fluid.

According to the present invention, the above and other objects can be accomplished by a welding robot including a stationary base, arm means mounted at one end portion on the body for swivel movement, hand means mounted on the other end portion of the arm means for movement about at least one axis and carrying welding gun means, conduit means for passing fluid therethrough, swivel joint means provided between said one end portion of the arm means and said base and having a stationary part and a movable part, said conduit means having a first part located in said base and connected with said stationary part of the swivel joint means and a second part located along said arm means and connected with said movable part of the swivel joint means.

In one mode of the present invention, the conduit means is means for supplying cooling medium to the welding gun means. In another mode, the robot includes actuator means for actuating said welding gun means to effect the movement of the hand means and the conduit means is means for supplying working fluid to said actuator means.

The above and other objects and features of the present invention will become apparent from the following descriptions of a preferred embodiment taking reference to the accompanying drawings.

DESCRIPTION OF THE PREFERRED EMBODIMENT

Figure 1:
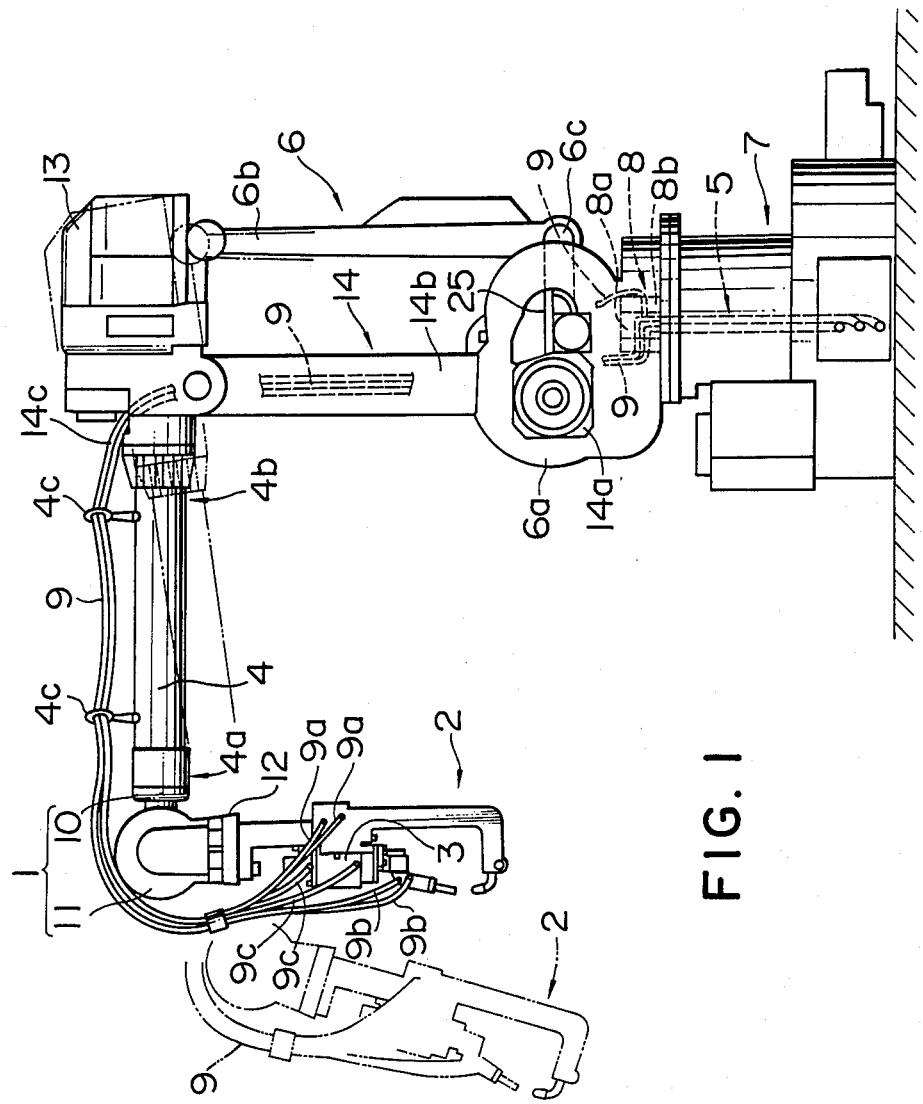
FIG. 1 is a front view of a spot welding robot in accordance with one embodiment of the present invention.

Referring to the drawings, particularly to FIG. 1, there is shown a welding robot having a stationary base 7 which is fixed to the floor of a factory. A robot body assembly 6 is mounted on the base 7 for a swivel movement about a vertical axis. The robot body assembly 6 includes a body 6a which is mounted on the base 7 for the aforementioned swivel movement, a swingable pillar 14 having a pillar casing 14b mounted at a lower end portion on the body 6a. A second pillar 6b is provided to extend in parallel with the pillar casing 14b. A lower link 25 is provided between the lower end portion 14a of the pillar casing 14b and the lower end portion 6c of the second pillar 6b. The lower link 25 is pivotably connected at one end with the lower end portion 14a of the pillar casing 14b and at the other end with the lower end portion 6c of the second pillar 6b. The top end portions of the pillars 14 and 6b are pivotably connected with a head casing 13 so that the head casing 13, the pillars 14 and 6b and the lower link 25 make a parallelogram which is swingable between an upright position shown by solid lines in FIG. 1 and a sidewardly swung position shown by phantom lines. The swinging movements of the pillars 6b and 14 are produced by means of an actuator which is provided in the body 6a.

A robot arm 4 is securely mounted at one end 4b on the head casing 13. At the other end 4a of the robot arm 4, there is a hand 1 which includes a swivel support 10, a bending member 11 mounted on the swivel support 10 and a twisting member 12 mounted on the bending member 11. A spot welding gun 2 is mounted on the twisting member 12. Actuators for the hand 1 are provided in the head casing 13.

Figure 2:
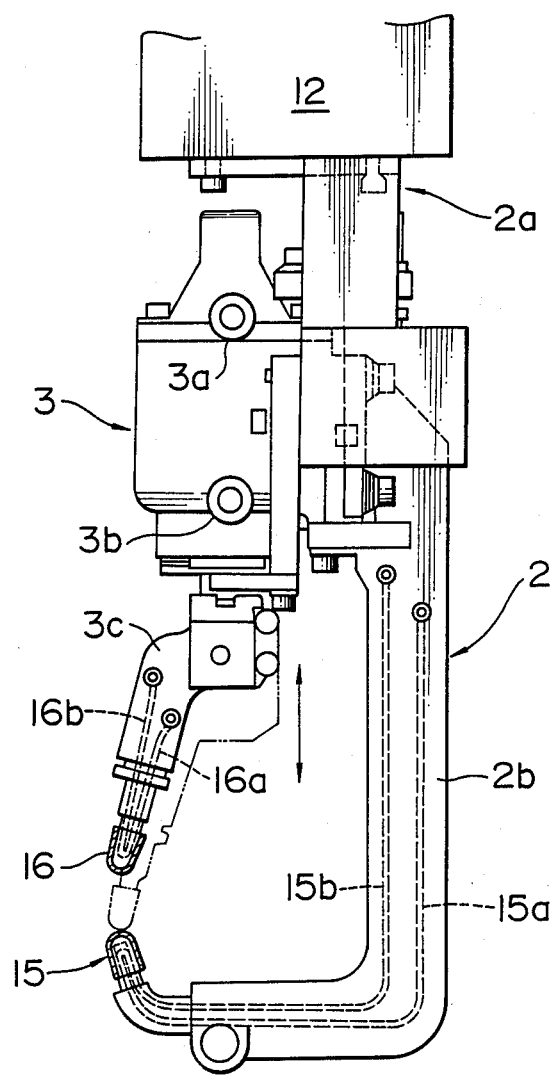
FIG. 2 is a front view of the welding gun used in the robot shown in FIG. 1; and, FIG. 3 is a sectional view of the swivel joint.

Referring now to FIG. 2, the welding gun 2 comprises a base portion 2a attached to the twisting member 12 of the hand 1 and a support 2b extending downwardly from the base portion 2a. A stationary electrode 15 is mounted on the lower end portion of the support 2b. At the upper end portion of the support 2b, there is mounted an air cylinder 3 which has a piston rod carrying a electrode support member 3c which carries a movable electrode 16. The air cylinder 3 includes hose fittings 3a and 3b for connection with air hoses which provides supplies of compressed air to the air cylinder 3. The air cylinder 3 functions to actuate the movable electrode 16 toward and away from the stationary elelctrode 15 as shown by an arrow in FIG. 2.

It will be noted in FIG. 2 that the support 2b is formed with cooling liquid passages 15a and 15b for circulating a cooling liquid through the stationary electrode 15. The electrode support member 3c is also formed with cooling liquid passages 16a and 16b for circulating a cooling liquid through the movable electrode 16.

Referring to FIG. 1, it will be noted that cooling liquid hoses 9a are connected to the cooling liquid passages 15a and 15b in the support 2b. Similarly, cooling liquid hoses 9b are connected to the cooling liquid passages 16a and 16b in the electrode support member 3c. Gun actuating compressed air hoses 9c are connected respectively to the hose fittings 3a and 3b to supply compressed air to the gun actuating cylinder 3. The hoses 9a, 9b and 9c are passed along the robot arm 4 and supported by hose clamps 4c which are provided on the robot arm 4. The pillar casing 14b of the robot body assembly 14 is of a hollow structure and the hoses 9a, 9b and 9c are passes through the hollow interior of the pillar casing 14b.

Figure 3:
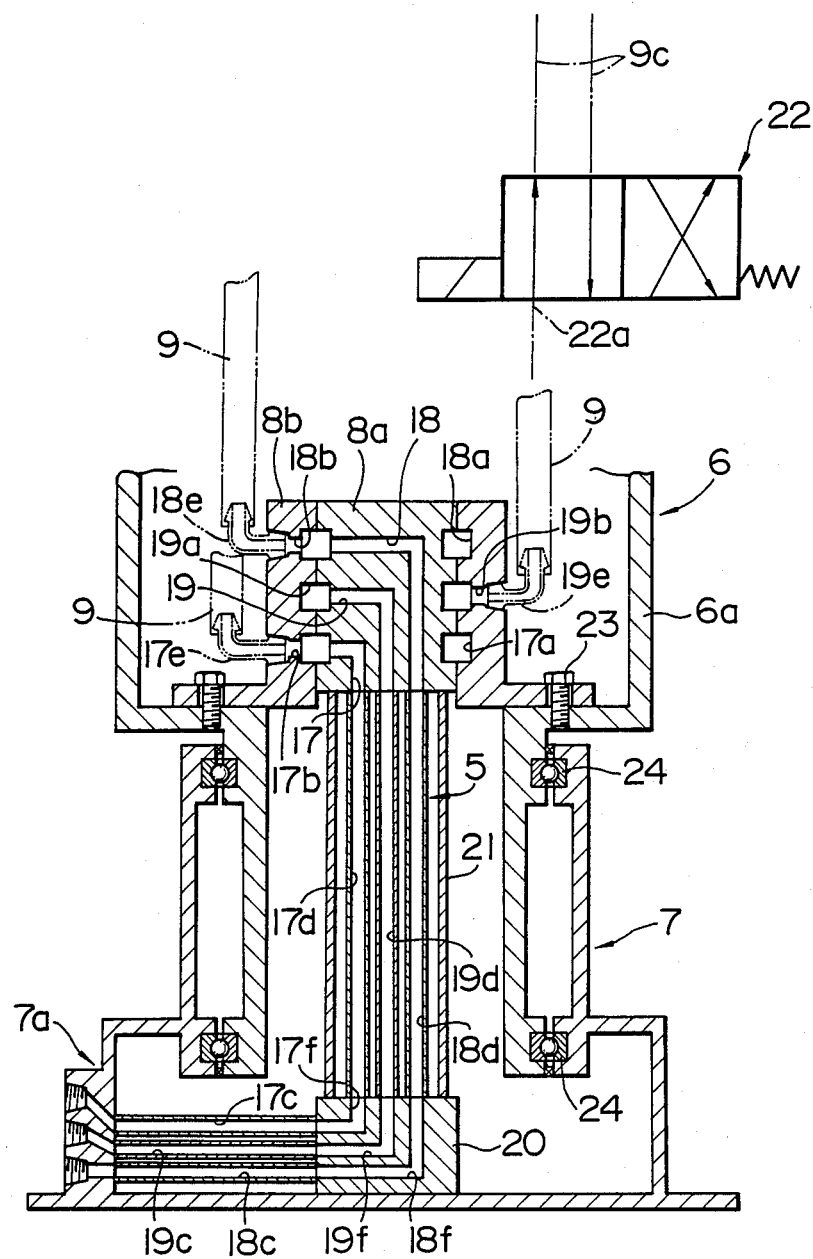

Referring now to FIG. 3, it will be noted that the robot body 6a is mounted on the base 7 for a swivel movement about a vertical axis by means of bearings 24. On the robot body 6a, there is provided a swivel joint 8 which comprises a stationary joint member 8a and a rotatable joint member 8b. The joint members 8a and 8b are coaxial with each other and the rotatable member 8b is fitted to the stationary member 8a. More specifically, the stationary joint member 8a has a cylindrical outer surface whereas the the rotatable joint member has a cylindrical inner surface and the cylindrical outer surface of the stationary member 8a is fitted to the cylindrical inner surface of the rotatable member 8b.

In the base 7, there is provided a pipe connector 20 which is fixed to the base 20 and has an upright tube 21 extending upwardly from the connector 20. The stationary joint member 8a is supported by the upright tube 21 at the upper end of the tube 21. The stationary joint member 8a is formed with a coolant supply passage 17, a coolant return passage 18 and a compressed air passage 19 which open at one ends to the bottom surface of the joint member 8a and at the other ends to the cylindrical side surface of the joint member 8a. As shown in FIG. 3, the passages 17 and 18 are opened to the side surface of the joint member 8a respectively at the lowest and the highest positions. The passage 19 is opened at a position between the passages 17 and 18.

The rotatable joint member 8b is formed at the inner surface with annular grooves 17a, 18a and 19a which are positioned to communicate with the passages 17, 18 and 19, respectively. The joint member 8b is further formed with radial passages 17b, 18b and 19b which extend outwardly respectively from the annual grooves 17a, 18a and 19a. One of the coolant hoses 9a and one of the coolant hoses 9b are connected with the radial passage 17b in the rotatable joint member 8b through pipe joints 17e whereas the other of the hoses 9a and the other of hoses 9b are connected with the radial passage 18b through pipe joints 18e.

The passages 17 and 18 in the stationary joint member 8a are connected respectively with pipes 17d and 18d which extend between the joint member 8a and the pipe joint 20. The pipe joint 20 is formed with coolant passages 17f and 18f which are respectively connected with the pipes 17d and 18d. In the base 7, there are provided coolant pipes 17c and 18c which are respectively connected with the passages 17f and 18f in the pipe joint 20.

In the pillar casing 14b of the robot body assembly 6, the compressed air hoses 9c are connected with a control valve 22 which has a pressure inlet port 22a connected with the radial passage 19b in the rotatable joint member 8b. The valve 22 functions to connect the radial passage 19b alternately with one or the other of the hoses 9c. The compressed air passage 19 in the stationary joint member 8a is connected with a pipe 19d in the tube 21. The pipe 19d extends between the joint member 8a and the pipe joint 20 which is formed with a compressed air passage 19f. The passage 19f is in turn connected with a pipe 19c provided in the base 7. The pipes 17c, 18c and 19c are opened to an end wall 7a of the base 7 and connected to appropriate fluid sources which are not shown in the drawings.

Although not shown in the drawings, the welding robot has an electronic control unit which functions to make the robot operate in a sequence which is preliminary taught to the robot. This feature is well known in the field of industrial welding robot so that detailed description will not be made.

The welding robot described above has flexible hoses 9a, 9b and 9c which are arranged to extend along the swingable robot arm 4 and also to extend in the hollow interior of the robot body assembly 6. Thus, the robot can be assembled with the conduits for circulating the cooling liquid and for supplying the gun actuating fluid in advance that the robot is installed in the position where it is to be operated. In installing the robot, it is only required to connect the pipes to the appropriate fluid sources. Thus, the time and labor for the installation of the robot is significantly decreased. Further, it is possible to prevent the pipes and hoses from being brought into contact with any other parts which are located in the vicinity of the robot so that the life of the conduits can be increased.

The invention has thus been shown and described with reference to a specific embodiment, however, it should be noted that the invention is in no way limited to the details of the illustrated structures but changes and modifications may be made without departing from the scope of the appended claims.

We claim:

1. A welding robot including a stationary base adapted to be placed on a floor, arm means mounted at one end portion of the base for swivel movement, hand means mounted on the other end portion of the arm means for movement about at least one axis and carrying welding gun means, conduit means for passing fluid therethrough, swivel joint means provided between said one end portion of the arm means and said base and having a stationary part provided with movable passage means which is in communication with said stationary passage means, said conduit means having a first part located in said base and connected with said stationary passage means in said stationary part of the swivel joint means and a second part located along said arm means and connected with movable passage means in said movable part of the swivel joint means.

2. A welding robot in accordance with claim 1 in which said conduit means is means for circulating cooling medium through said welding gun means.

3. A welding robot in accordance with claim 1 which includes gun actuating means for actuating said welding gun means, said conduit means being means for supplying gun actuating working fluid to said gun actuating means.

4. A welding robot in accordance with claim 3 in which said gun actuating working fluid is compressed air.

5. A welding robot in accordance with claim 1 in which said arm means includes swivel body means mounted at one end portion on said base for a swivel movement about an axis and a swingable arm connected at one end to the other end portion of the swivel body, said conduit means being arranged to extend outside said swingable arm along the same and to extend in the swivel body means.

6. A welding robot including a stationary base, body means mounted on said stationary base for swivel movement and supporting arm means at one end portion of said arm means for swingable movement, hand means mounted on the other end portion of the arm means for movement about at least one axis and carrying welding gun means, conduit means for passing fluid therethrough, swivel joint means provided between said body means and said base and having a stationary part provided with stationary passage means and a movable part provided with movable passage means which is in communication with said stationary passage means, said conduit means having a first part located in said base and connected with said stationary passage means in said stationary part of the swivel joint means and a second part located along said arm means and connected with said movable passage means in said movable part of the swivel joint means.

7. A welding robot including a stationary base, means for mounting arm means at one end portion on said base for swivel movement, hand means mounted on the other end portion of the arm means for movement about at least one axis and carrying welding gun means, conduit means for passing fluid therethrough, swivel joint means provided in said mounting means between said one end portion of the arm means and said base and having a stationary part provided with stationary passage means and a movable part provided with movable passage means which is in communication with said stationary passage means, said conduit means having a first part located in said base and connected with said stationary passage means in said stationary part of the swivel joint means and a second part located along said arm means to extend outside said arm means and connected with said movable part of the swivel joint means.

* * * * *